United States Patent [19]

Paull et al.

[11] 4,184,322
[45] Jan. 22, 1980

[54] PARTIAL OXIDATION PROCESS

[75] Inventors: Peter L. Paull, Weston, Conn.; Rodney McGann, Santa Cruz, Calif.

[73] Assignee: Texaco Inc., White Plains, N.Y.

[21] Appl. No.: 855,642

[22] Filed: Nov. 29, 1977

Related U.S. Application Data

[63] Continuation-in-part of Ser. No. 698,438, Jun. 21, 1976, Pat. No. 4,099,383.

[51] Int. Cl.$^2$ .............................................. F02G 3/00
[52] U.S. Cl. .................................. 60/39.02; 60/39.12; 60/646; 60/648; 165/134 R; 48/197 R; 252/373
[58] Field of Search ................. 60/648, 646, 655, 657, 60/670, 39.12, 39.02; 48/197 R, 215; 252/373; 165/134

[56] References Cited

U.S. PATENT DOCUMENTS

| | | | |
|---|---|---|---|
| 2,471,755 | 5/1949 | Karrer | 60/655 |
| 3,164,644 | 1/1965 | De Ghetto et al. | 165/134 |
| 3,922,148 | 11/1975 | Child | 252/373 X |
| 4,074,981 | 2/1978 | Slater | 48/197 R |

Primary Examiner—Allen M. Ostrager
Assistant Examiner—Stephen F. Husar
Attorney, Agent, or Firm—Thomas H. Whaley; Carl G. Ries; Albert Brent

[57] ABSTRACT

Sensible heat in the hot effluent gas stream leaving a partial oxidation gas generator for the production of gaseous mixtures comprising $H_2+CO$ i.e. synthesis gas, reducing gas, or fuel gas, is used at maximum temperature to heat a stream of gaseous heat transfer fluid comprising a portion of the product gas circulating in the substantially closed loop. The heat transfer fluid serves as the working fluid in a turbine that produces mechanical work, electrical energy, or both. Further, the heat transfer fluid leaving the turbine may be used to preheat hydrocarbonaceous feed and free-oxygen containing gas which is then introduced into the gas generator. Optionally, by-product superheated steam may be produced at high temperature levels for use in the gas generator and as the working fluid in an expansion turbine. The high steam superheat temperatures result in higher conversion efficiencies. A shell and tube heat exchanger in which cleaned and optionally purified generator gas is continuously bled from inside the tubes to the outside, or the reverse is employed. By this means a continuously flowing protective sheath or curtain of the comparatively cooler bleedstream is placed between the surfaces of the tubes and headers, if any, in the heat exchanger and the surrounding hot effluent gas stream from the gas generator which enters the heat exchanger at maximum temperature. The surfaces of the tubes and headers, if any, are thereby protected against corrosive gas attack and deposits of ash, slag, and soot. The bleedstream mixes with the effluent gas stream passing through the heat exchanger and a portion of this mixture is recycled as make-up.

37 Claims, 1 Drawing Figure

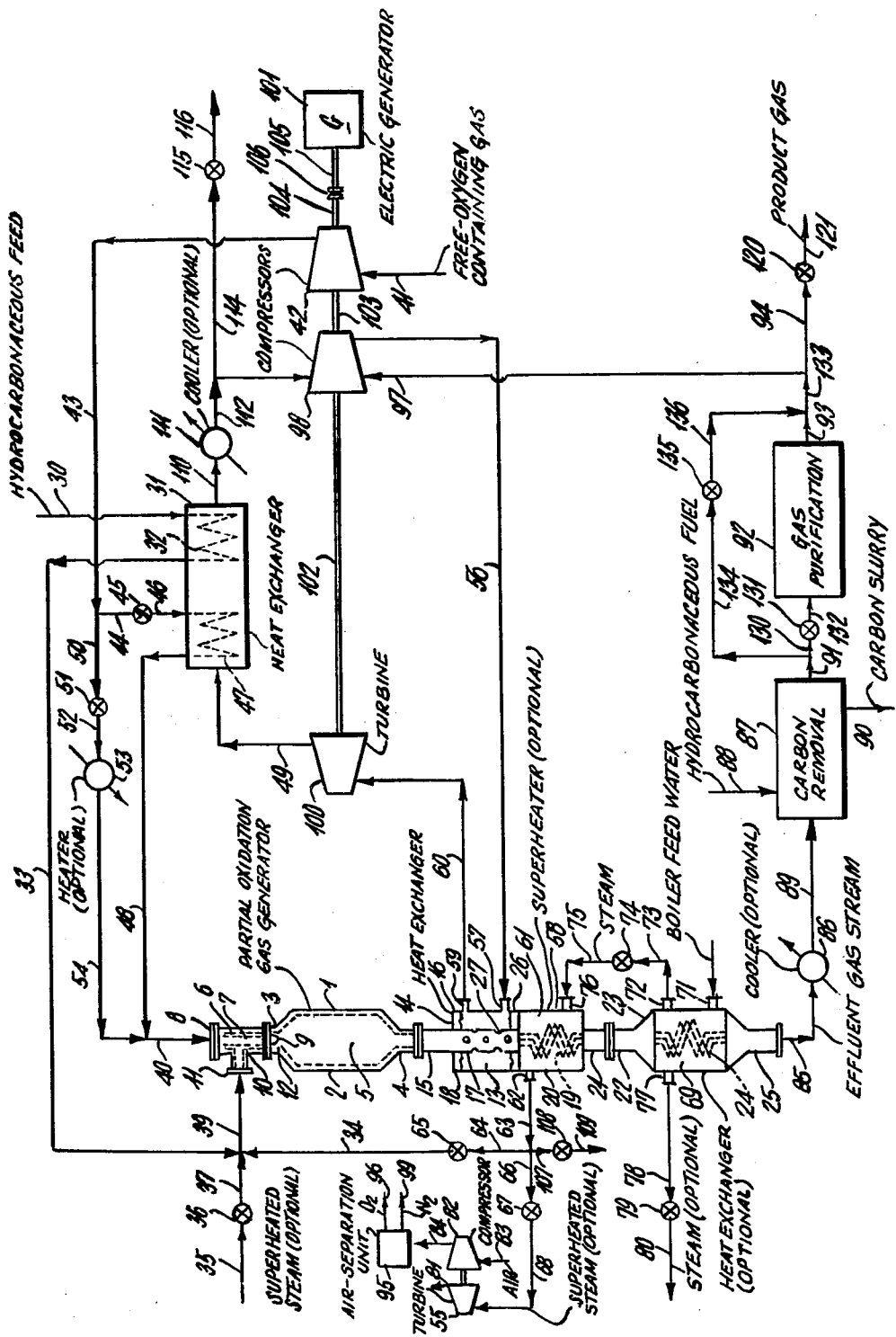

PARTIAL OXIDATION PROCESS

CROSS-REFERENCE TO RELATED APPLICATION

This application is a continuation-in-part of our co-pending application Ser. No. 698,438, filed June 21, 1976, now U.S. Pat. No. 4,099,383.

BACKGROUND OF THE INVENTION

1. Field of the Invention

This invention pertains to a partial oxidation process for making synthesis gas, fuel gas, or reducing gas along with mechanical work, electrical energy, or both.

2. Description of the Prior Art

In the partial oxidation process, the effluent gas stream leaving the gas generator at a temperature in the range of about 1500° to 3000° F. must be cooled below the equilibrium temperature for the desired gas composition. This is presently done by quenching the effluent gas stream in water, or by cooling the gas stream in a waste heat boiler, thereby producing saturated steam. Both of these methods of gas cooling result in large increases in entropy and reduced thermal efficiencies. This problem is substantially overcome in the subject process by using the sensible heat in the hot effluent gas stream leaving the partial oxidation gas generator at a higher level of heat exchange.

Coassigned U.S. Pat. No. 3,868,817 discloses the production of a purified fuel gas which is burned in the combustion chamber of a gas turbine. The clean flue gas is then expanded in a turbine.

SUMMARY

At its maximum exit temperature i.e. 1500°–3500° F., an effluent gas stream comprising raw synthesis gas, reducing gas, or fuel gas from a free-flow noncatalytic partial oxidation gas generator is passed through a first heat exchange zone in heat exchange with a continuous stream of gaseous heat transfer fluid comprising a portion of the product gas which circulates in a substantially closed power loop. The heat transfer gas absorbs heat from the effluent gas stream and is then passed through a turbine to produce mechanical work and electrical energy. The hydrocarbonaceous feed stream, and optionally the free-oxygen containing gas feed stream to the gas generator may be separately preheated in a separate heat exchange zone by heat exchange with the heat transfer fluid leaving said turbine. Optionally, by-product steam and superheated steam may be produced subsequently by the absorption of sensible heat remaining in the effluent gas stream. The high steam superheat temperature gives a high conversion efficiency in a steam turbine.

A shell and tube heat exchanger in which cleaned and optionally purified generator gas is continuously bled from inside the tubes to the outside, or the reverse is employed. The bleedstream mixes with the effluent gas stream passing through the heat exchanger. By this means a continuously flowing protective sheath or curtain of the comparatively cooler bleedstream is placed between the surfaces of the tubes and headers, if any, in the heat exchanger and the surrounding hot effluent gas stream from the gas generator which enters the heat exchanger at maximum temperature. The surfaces of the tubes and headers, if any, are thereby protected against corrosive gas attack and deposits of ash, slag, and soot.

A portion of the mixture of effluent gas and gaseous bleedstream from said heat exchanger is cleaned, optionally purified, and discharged from the system as the product gas. A portion of the product gas, as make-up for the bleedstream, is compressed along with the cooled turbine exhaust to a pressure greater than that in the gas generator and recycled to said heat exchanger for reheating.

BRIEF DESCRIPTION OF THE DRAWING

The invention will be further understood by reference to the accompanying drawing which is a schematic representation of a preferred embodiment of the process.

DESCRIPTION OF THE INVENTION

The present invention pertains to an improved continuous partial oxidation gasification process for producing synthesis gas, reducing gas, or fuel gas along with valuable by-product saturated and superheated steam. Mechanical work i.e. gas compression, and electrical energy are also produced by the process. The aforesaid gas streams comprise $H_2$, $CO$, and at least one member of the group $H_2O$, $CO_2$, $H_2S$, $COS$, $CH_4$, $N_2$, $A_r$, and particulate carbon.

In the subject process, a continuous hot effluent gas stream of raw synthesis gas, reducing gas or fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906.

A wide range of combustible carbon containing organic materials may be reacted in the gas generator with a free-oxygen containing gas, optionally in the presence of a temperature moderating gas, to produce said effluent gas stream.

The term hydrocarbonaceous as used herein to describe various suitable feedstocks to the partial oxidation gas generator is intended to include gaseous, liquid, and solid hydrocarbons, carbonaceous materials, and mixtures thereof. In fact, substantially any combustible carbon containing organic material, fossil fuel, or slurries thereof, may be included within the definition of the term "hydrocarbonaceous". For example, there are (1) pumpable slurries of solid carbonaceous fuels, such as coal, lignite, particulate carbon, petroleum coke, concentrated sewer sludge, and mixtures thereof in water or a liquid hydrocarbon; (2) gas-solid suspension such as finely ground solid carbonaceous fuels dispersed in either a temperature moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand oil and shale oil, coal derived oil, aromatic hydrocarbon (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas. coke-oven gas, refinery gas, acetylene tail gas, ethylene off-gas, synthesis gas, and mixtures thereof. Both gaseous and liquid feeds may be mixed and used simultaneously, and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature or it is preferably preheated to a temperature up to as high as about 600° F. to 1,200° F., say 800° F. but preferably below its cracking temperature. Preheating the hydrocarbonaceous feed may be accomplished by noncontact heat exchange with heat transfer fluid that was previously heated by heat exchange with the effluent gas stream directly leaving the gas generator. The hydrocarbonaceous feed may be introduced into the burner in liquid phase or in a vaporized mixture with a temperature moderator. Suitable temperature moderators include superheated steam, saturated steam, unsaturated steam, water, $CO_2$-rich gas, a portion of the cooled exhaust from a turbine employed downstream in the process, nitrogen in air, by-product nitrogen from a conventional air separation unit, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels, however, generally, one is used with liquid hydrocarbon fuels and with substantially pure oxygen. The temperature moderator may be introduced in admixture with either or both reactant streams. Alternatively, the temperature moderator may be introduced into the reaction zone of the gas generator by way of a separate conduit in the fuel burner.

From about 0 to 100% of the superheated steam produced subsequently in the subject process may be used to preheat and disperse the liquid hydrocarbonaceous feed, or to preheat and entrain the solid carbonaceous fuels and then introduced into the gas generator.

The weight ratio of total amount of $H_2O$ to fuel introduced into the reaction zone of the gas generator is in the range of about 0 to 5.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or a combination thereof. In such case, the weight ratio of water to hydrocarboaceous feed may be in the range of about 0.0 to 1.0 and preferably 0.0 to less than 0.2.

The term free-oxygen containing gas, as used herein is intended to include air, oxygen-enriched air, i.e. greater than 21 mole % oxygen, and substantially pure oxygen, i.e. greater than 95 mole % oxygen, (the remainder comprising $N_2$ and rare gases). Free-oxygen containing gas may be introduced into the burner at a temperature in the range of about ambient to 1,800° F. The ratio of free oxygen in the oxidant to carbon in the feedstock (O/C, atom/atom) is preferably in the range of about 0.7 to 1.5. Preheating the free-oxygen containing gas may be accomplished by noncontact heat exchange with a heat transfer fluid that was previously heated by heat exchange with the effluent gas stream directly leaving the gas generator. In such case, the heat transfer fluid is preferably inert.

The feedstreams are introduced into the reaction zone of the fuel gas generator by means of a fuel burner. Suitably, an annulus-type burner, such as described in coassigned U.S. Pat. No. 3,874,592 may be employed.

The feedstreams are reacted by partial oxidation without a catalyst in the reaction zone of a free-flow gas generator at an autogenous temperature in the range of about 1500° F. to 3500° F. and at a pressure in the range of about 1 to 250 atmospheres absolute (atm. abs.) such as about 50 to 3700 psia. The reaction time in the fuel gas generator is about 1 to 10 seconds. The effluent stream of gas leaving the gas generator comprises $H_2$, CO, and at least one member of the group $H_2O$, $CO_2$, $H_2S$, COS, $CH_4$, $N_2$, $A_r$, and particulate carbon. The amount of unreacted particulate carbon (on the basis of carbon in the feed by weight) is about 0.2 to 20 weight percent from liquid feeds, but is usually negligible from gaseous hydrocarbon feeds. The specific composition of the effluent gas is dependent on actual operating conditions and feedstreams. Synthesis gas substantially comprises $H_2+CO$; all or most of the $H_2O$ and $CO_2$ are removed for reducing gas; and the $CH_4$ content is maximized for fuel gas.

A continuous stream of hot effluent gas, at substantially the same temperature and pressure as in the reaction zone leaves from the axial exit port of the gas generator and is then introduced directly to a first heat exchange zone. Optionally, a solids separation zone (not shown in the drawing) may be inserted between the exit port of the gas generator and said first heat exchange zone. The solids separation zone may comprise a free-flow catchpot i.e. slag chamber which may be inserted in the line before the first heat exchanger. By this means at least a portion of any solid matter i.e. particulate carbon, ash, slag, refractory, and mixtures thereof that may be entrained in the hot effluent gas stream, or which may flow from the gas generator i.e. slag, ash, bits of refractory may be separated from the effluent gas stream and recovered with very little, if any, pressure drop in the line. A typical free-flow slag chamber that may be employed is shown in FIG. 1 of the drawing for coassigned U.S. Pat. No. 3,528,930. Thus in the subject process carbon from the effluent gas stream, scale, and solidified slag or ash from the fuel and refractory may be withdrawn periodically from a solids separation zone, such as from the lowermost portion of the slag-accumulation zone 23 in coassigned U.S. Pat. No. 3,528,930.

At least a portion of the sensible heat in the effluent gas stream directly leaving the gas generator or the solids separation zone is recovered in a first heat exchange zone. Thus heat exchange takes place in the first heat exchange zone comprising at least one shell and tube heat exchanger between a continuous stream of gaseous heat transfer fluid entering from a closed power loop and the continuous stream of hot effluent gas directly leaving the gas generator at an exit temperature in the range of about 1500°-3500° F. The shell and tube heat exchanger comprises a plurality of tubes or coils. Optionally, the ends of the tubes and coils terminate in upstream and downstream headers. The headers may be placed inside or outside of the shell. The tubes, and optionally the headers, if any, are provided with openings in the walls through which at least a portion i.e. about 1–50 volume %, say about 3–25 volume % of the gaseous heat transfer fluid bleeds into the hot effluent gas stream which is simultaneously passing through the heat exchanger at a lower pressure. But before said mixing, the comparatively cooler bleedstream of gaseous heat transfer fluid forms a continuously flowing protective sheath or curtain between the hot effluent gas stream and the surface of the tubes and headers, if any, that would ordinarily be contacted by said effluent gas stream. By this means the surfaces of the tubes and headers, if any, such as the upstream header, may be cooled and protected against corrosive gas attack, as well as from deposits of ash, slag, and soot that may be contained in the effluent gas stream. The drawing shows the gaseous heat transfer fluid flowing up through the shell side of the first heat exchanger and the hot effluent gas stream from the gas generator or from a solids separation zone following said gas generator, simultaneously flowing down through the tubes and headers of said heat exchanger. Alternatively, the gaseous heat transfer fluid may flow up through the tubes and headers of said first heat exchanger with said effluent gas stream simultaneously flowing down through the shell side of said heat exchanger. Heat exchange takes place in the first heat exchanger by radiation, convection, and by direct contact between the bleedstream of gaseous heat transfer fluid and the hot effluent gas stream from the gas generator.

The gaseous heat transfer fluid enters the first heat exchange zone at a temperature in the range of about 100° F. to 1300° F., say about 100°–500° F. and leaves at a temperature in the range of about 800° F. to 2800° F., say about 1300° F. to 2800° F. The pressure of the heat transfer fluid is always about 1–100 psia, say about 5–50 psia, or more, than the pressure of the hot effluent gas stream. This provides a suitable pressure differential for bleeding the gaseous heat transfer fluid through openings such as narrow slots or small diameter holes i.e. 0.001 to 0.062 inches in the walls of the tubes and headers, if any. The hot raw effluent gas stream leaves the first heat exchange zone at a temperature in the range of about 300° to 3000° F., say about 600° to 2400° F. At least a portion of the sensible heat of the hot effluent gas stream is given up to the heat transfer fluid. Porous metals and ceramics may be used in the first heat exchanger. The effluent gas stream from the gas generator may flow through the tubes of a shell and tube-type heat exchanger or pass through in the shell side. Simultaneously, the gaseous heat exchange fluid passes in heat exchange through the remaining path in preferably indirect flow.

The gaseous heat transfer fluid heated in the first heat exchange zone is preferably a portion of the synthesis gas, reducing gas, or fuel gas produced in the process and comprises in mole %: $H_2$ 70 to 10, CO 15 to 57, $CO_2$ 0 to 5, N 0 to 75, $A_r$ 0 to 1.0, $CH_4$ 0 to 25, $H_2S$ 0 to 2.0, COS 0 to 0.1, and $H_2O$ 0 to 20. In one embodiment hydrogen i.e. 98 mole % or more is produced from the effluent gas stream from the gas generator and used as the gaseous heat transfer fluid.

The raw effluent gas stream is then optionally further cooled, cleaned to remove particulate carbon, and optionally purified to remove unwanted gas constituents. Cooling the raw gas stream to a temperature in the range of about 100° F. to 800° F., say about 300° F. to 675° F., and some cleaning may be effected by contacting the gas stream with a scrubbing fluid. For example, the raw gas stream may be immersed in water or a liquid hydrocarbon contained in a quench tank such as shown in coassigned U.S. Pat. No. 2,896,927.

Particulate carbon and any other entrained solids, if present, may be removed from the raw product gas in the gas cleaning zone. Slurries of particulate carbon in a liquid hydrocarbon fuel may be produced in the cleaning zone, and may be recycled to the fuel gas generator as at least a portion of the feedstock. Any conventional procedure suitable for removing suspended solids from a gas stream may be used. In one embodiment of the invention, the stream of raw product gas is introduced into a gas-liquid scrubbing zone where it is scrubbed with a scrubbing fluid such as liquid hydrocarbon or water. A suitable liquid-gas tray-type column is more fully described in coassigned U.S. Pat. No. 3,816,332.

Thus, by passing the stream of raw gas up a scrubbing column in direct contact and countercurrent flow with a suitable scrubbing fluid or with dilute mixtures of particulate carbon and scrubbing fluid flowing down the column, the particulate carbon may be removed from the synthesis gas. A slurry of particulate carbon and scrubbing fluid is removed from the bottom of the column and sent to a carbon separation or concentration zone. This may be done by any conventional means that may be suitable e.g. filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon are recycled to the top of the column for scrubbing more synthesis gas.

Other suitable conventional gas cooling and cleaning procedures may be used in combination with or in place of the aforesaid scrubbing column. For example, the raw gas stream may be introduced below the surface of a pool of quenching and scrubbing fluid by means of a dip-tube unit. Or the stream of raw gas may be passed through a plurality of scrubbing steps including an orifice-type scrubber or venturi nozzle scrubber such as shown in coassigned U.S. Pat. No. 3,618,296.

Substantially no particulate carbon is produced with gaseous hydrocarbonaceous fuels, such as natural gas or methane. In such case, the aforesaid gas scrubbing step may not be necessary.

$H_2S$ and COS may be present in the process gas stream depending upon the sulfur content of the hydrocarbonaceous feedstock to the gas generator. Optionally, in a gas purification zone, any gaseous impurities such as corrosive $CO_2$ and $H_2O$ may be removed from the cooled and cleaned stream of gas leaving the gas cleaning zone. At least a portion i.e. 5 to 100 volume % of the process gas stream may by-pass the gas purification zone, depending on the composition of the gas stream.

Suitable conventional processes may be used in the gas purification zone involving refrigeration and physical or chemical absorption with solvents, such as methanol, n-methylpyrrolidone, triethanolamine, propylene carbonate, or alternatively with hot potassium carbonate. In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole percent $O_2$ or more) for use as the free-oxygen containing gas used in the gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volume 19, John Wiley, 1969, Page 353. Excess $SO_2$ may be removed and discarded in chemical combination with limestone, or by means of a suitable commercial extraction process.

A stream of clean product gas leaves from the gas purification zone at a temperature in the range of about 100° to 800° F., say about 350° F. to 675° F. and at a pressure in the range of about 10 to 180 atm. abs. and preferably 15 to 60 atm. abs. and most preferably at the pressure substantially the same as that produce in the gas generator less ordinary line drop.

Clean synthesis gas having the following composition in mole % may be made by the aforesaid process: $H_2$ 10 to 48, CO 15 to 48, and the remainder comprising $N_2+A_r$.

A portion of the product gas may be burned in the combustor of a gas turbine as fuel. The gaseous products of combustion are then passed through an expansion turbine as the working fluid for the production of power, for example to power gas compressors or electric generators.

When it is desired to produce hydrogen from synthesis gas, the CO is converted into $H_2+CO_2$ by the water-gas shift reaction. The $CO_2$ is removed by chemical absorption to produce substantially pure hydrogen i.e. at least 98 mole % $H_2$. Hydrogen transfers more heat with less material and at a lower metal temperature. Because hydrogen is readily available as a low cost by-product of the subject process, and because of its favorable thermal properties, hydrogen is particularly advantageous for use as the gaseous heat transfer fluid. Thus, at a great economic benefit, at least a portion of the product gas is used as said gaseous heat transfer fluid in the power loop as make-up to replace said bleed stream and any leakage from for example seals and flanges. This make-up stream may amount of about 1 to 50 volume %, say 3-25 volume % of the total amount of gaseous heat transfer fluid. The temperature of the make-up gas stream is in the range of about 100° F. to 800° F., say 350° F. to 750° F., and the pressure may be in the range of about 1 to 180 atmospheres, say 15 to 60 atmospheres.

The hot gaseous heat transfer fluid leaves the first heat exchange zone at a temperature in the range of about 800° F. to 2800° F., say about 800° F. to 1800° F. and a suitable pressure in the range of about 150 to 3800 psia and is passed through at least one power-developing turbine as the working fluid. Coupled through a variable-speed drive if desired to the axis of the turbine and driven thereby may be at least one electric generator and at least one turbo compressor. Preferably, said turbo compressor is used to compress the gaseous heat transfer fluid plus make-up that is cycled in the power loop. Further, free-oxygen containing gas may be compressed to the desired pressure for introduction into the gas generator by means of another compressor. Alternatively, a single multi-stage turbocompressor may be employed with the different fluids being compressed in the different stages of the compressor.

The gaseous heat transfer fluid may leave the turbine at a temperature in the range of about 500° to 1800° F. The discharge pressure may be in the range of about 15 to 150 psia. It may then be passed through a fourth heat exchange zone where it is cooled by noncontact heat exchange with at least one of the following materials: a feed stream of hydrocarbonaceous fuel, the free-oxygen containing gas feedstream, steam, and water. Two separate conventional shell and tube-type heat exchangers connected in tandem may be employed in the fourth heat exchange zone. Alternately, two heat exchangers contained in the same shell may be employed to preheat the two separate feed streams. The heat transfer fluid may be passed through the tubes or through the shell side in one or both heat exchangers.

When the free-oxygen feed stream is preheated in said fourth heat exchange zone, the temperature of the stream of heat transfer fluid after heat exchange with the free-oxygen containing gas may be in the range of about 100° to 1500° F. The free-oxygen containing gas may enter the system at a temperature in the range of about ambient to 1000° F. and a pressure in the range of about atmospheric to 3500 psia. After being compressed to a pressure above that of the gas generator by means of said compressor, the free-oxygen containing gas may be preheated to a temperature in the range of about 200° to 1800° F. by noncontact heat exchange with said heat transfer fluid as previously described, or in a separate heater, and then passed into said gas generator by way of a burner.

The temperature of the stream of gaseous heat transfer fluid after heat exchange with the hydrocarbonaceous feed may be in the range of about ambient to 1200° F. The hydrocarbonaceous fuel, or liquid oxygenated hydrocarbonaceous fuel, or slurry of solid carbonaceous fuel and water or liquid hydrocarbon enters the system at a temperature in the range of about ambient to 500° F. The hydrocarbonaceous feed to the gas generator may be preheated by being pumped through said heat exchanger in noncontact heat exchange with said heat transfer fluid where its temperature is increased to a value in the range of about 200° to 1200° F., say 800° F.

Alternately, the heat transfer fluid in the fourth heat exchange zone may be cooled to a temperature in the range of about 60° to 300° F. by noncontact heat exchange with boiler feed water. The boiler feed water may enter the fourth heat exchange zone at a temperature of about ambient to 675° F. and may leave as hot water or steam at a temperature in the range of about 100° to 1100° F. Optionally, the steam produced may be used as the working fluid in a steam turbine.

By way of a burner, the aforesaid preheated stream of free-oxygen containing gas and the stream of hydrocarbonaceous feed optionally in admixture with a temperature moderator, are then introduced into the partial oxidation gas generator. The impinging streams produce in the reaction zone a gaseous dispersion of hydrocarbonaceous fuel in free-oxygen containing gas and optionally temperature moderator.

After heat exchange with said hydrocarbonaceous feed stream, the gaseous heat transfer fluid may be optionally passed through another heat exchanger. For example, boiler-feed-water at ambient temperature may be preheated to a temperature in the range of about 100° to 500° F. by noncontact heat exchange with said heat transfer fluid which may be reduced to a temperature in the range of about 60° to 300° F.

As used herein by definition, the words "noncontact" and "indirect" mean that there is no mixing between the two gas streams. Preferably, these two streams run in opposite directions i.e. countercurrent flow. However, they may run in the same direction i.e. concurrent flow. Any suitable heat exchanger that is capable of withstanding the temperatures and pressures of the fluids may be used. Heat resistant metals and ceramics may be employed as construction materials. Shell and tube and fire-tube construction may be employed.

The pressures of said gaseous heat transfer fluid and said make-up gaseous heat transfer fluid are then increased and the cycle is repeated as previously discussed. Thus, the pressure of the mixture of gaseous heat transfer fluid and make-up gas is increased above that of the raw effluent gas stream passing through said first heat exchange zone in order to permit bleeding of the gaseous heat transfer fluid through the holes in the tubes and headers, if any, and into the raw effluent gas stream. The pressure differential between said streams is in the range of about 5 to 100 psia, say 10 to 50 psia. For example, the gaseous heat transfer fluid and make-up gas may be compressed to a pressure in the range of about 150 to 3800 psia, say 150 to 1500 psia, but above that of the raw effluent gas stream in heat exchanger 1. Advantageously, the compressor may be driven by the expansion turbine. The heat transfer fluid remains in the gaseous phase throughout the power loop.

In another embodiment of the process, the effluent gas stream directly after being passed in heat exchange with said gaseous heat transfer fluid in said first heat exchange zone is passed directly into a second heat exchange zone in indirect noncontact heat exchange with a continuous stream of steam. The steam was previously produced downstream in a third heat exchange zone. Thus, superheated steam may be produced in the second heat exchange zone at a temperature in the range of about 750° F. to 1100° F. and a pressure in the range of about 65 to 3800 psia.

At least a portion of the by-product superheated steam produced by the subject process may be introduced into the partial oxidation gas generator where it may react and thereby contribute to the amount of hydrogen in the effluent gas stream. Further, the thermal efficiency of the process is improved. Condensation problems that may result when steam and hydrocarbonaceous fuels are mixed together may be avoided by using superheated steam. Advantageously, a portion of the superheated steam may be used as the working fluid in a turbocompressor to compress air which is fed to an air separation unit for producing substantially pure oxygen (95 mole % or more). At least a portion of this oxygen may be introduced into the gas generator as the oxidant reactant. The superheated steam may also be used as the working fluid in a turboelectric generator. Starting with superheated steam at a very high temperature level and converting the heat into electricity favorably affects the conversion effliciency.

In a third heat exchange zone downstream in the process, a portion of the remaining sensible heat in the effluent gas stream leaving the second heat exchange zone may be recovered. The effluent gas stream may be passed in noncontact heat exchange with boiler-feed-water to produce steam having a temperature in the range of about 298° F. to 705° F., or higher, and a pressure in the range of about 65 to 3800 psia. In such case the temperature of the raw effluent gas stream may drop to about 300° F. to 700° F. The steam produced in said third heat exchange zone is introduced into said second heat exchange zone where it is converted into superheated steam, as previously described. The raw effluent gas stream leaving the third heat exchange zone is optionally cooled, cleaned to remove entrained solid particles, optionally purified, and at least a portion is compressed and introduced into the power loop as make-up gaseous heat transfer fluid, in the manner previously described.

The three heat exchange zones may be contained in separate vessels connected in series. Alternately, heat exchange zones 1 and 2; or 2 and 3; or 1, 2, and 3 may be contained within the same shell. For example, the first and second heat exchange zones may be contained within the first shell and the third heat exchanger may be contained in a separate shell connected in series with the first shell, as shown in the drawing. The effluent gas stream from the gas generator may flow through the tubes of the shell and tube-type heat exchangers or pass through on the shell side of any of the three heat exchangers. Simultaneously, the other fluid passes in heat exchange through the remaining path in preferably countercurrent flow.

DESCRIPTION OF THE DRAWING

A more complete understanding of the invention may be had by reference to the accompanying schematic drawing which shows an embodiment of the previously described process in detail. All of the lines and equipment are preferably insulated to minimize heat loss.

Referring to the figure in the drawing, free-flow noncatalytic partial oxidation gas generator 1 lined with refractory 2 as previously described has an upstream axially aligned flanged inlet port 3, a downstream axially aligned flanged outlet port 4, and an unpacked reaction zone 5. Annulus type burner 6, as previously described, with center passage 7 in alighment with the axis of gas generator 1 is mounted in inlet port 3. Center passage 7 has an upstream inlet 8 and a converging conical shaped downstream nozzle 9 at the tip of the burner. Burner 6 is also provided with concentric coaxial annulus passsage 10 that has an upstream inlet 11 and a downstream conical shaped discharge passage 12. Burners of other design may also be used.

Connected to outlet port 4 is the flanged inlet port 15 of shell and tube high temperature heat exchanger 16 which comprises a plurality of tubes 17 whose upper ends terminate in upstream header 18 and whose lower ends terminate in downstream header 26. Small diameter holes 27 in tubes 17 and in both headers 18 and 26 permit a portion of the gaseous heat transfer fluid flowing outside of said tubes and headers to bleed in and mix with the hot effluent gas stream flowing within said tubes and headers of said heat exchanger. Before mixing, however, a continuously flowing sheath or curtain of gaseous heat transfer fluid bleeding through said openings forms between the inside surfaces of said tubes and headers and the surrounding hot effluent gas stream. Optionally, a solids or slag separator (not shown in the drawing) may be inserted between outlet 4 of gas generator 1 and inlet 15 of heat exchanger 16. Heat exchanger or superheater 58 and heat exchanger 23 are optionally inserted in the line downstream from heat exchanger 16 to make respectively superheated steam and saturated or unsaturated steam by utilizing the sensible heat in the effluent gas stream from the gas generator.

In a first heat exchange zone, gaseous heat transfer fluid circulating in a power loop is reheated. Thus, the effluent gas stream from gas generator 2 may pass through outlet port 4, inlet port 15, and upper chamber 18 containing heat exchanger 16. Heat exchanger 16 comprises upstream header 14, tubes or multiple coils 17, downstream header 26, and shell side 13. Small diameter holes in tube 17 and headers 14 and 26 permit the passage of gaseous heat transfer fluid, as previously mentioned.

The partially cooled effluent gas stream leaving heat exchanger 16 in upper chamber 18 may be optionally passed through heat exchanger or superheater 58 in lower chamber 20 to provide heat for superheating steam. Thus, the effluent gas stream passes from upper chamber 18 through tubes or multiple coils 19 of heat exchanger 58 in lower chamber 20 and leaves by outlet port 21. Steam passes up through the shell side 61 of heat exchanger 58 and is superheated.

Optionally, in heat exchanger 23, steam may be produced from boiler feed water. Thus the partially cooled effluent gas stream leaves heat exchanger 58 through port 21, enters heat exchanger 23 through inlet 22, passes through tubes or multiple coils 24, and leaves by outlet 25. Boiler feed water passes up through the shell side 69 of heat exchanger 23.

A continuous stream of hydrocarbonaceous feed in liquid or vapor form or liquid oxygenated hydrocarbonaceous fuel or a pumpable slurry of a solid carbonaceous fuel and water or liquid hydrocarbon as previously described, may be pumped into the system by way of line 30.

The hydrocarbonaceous feed stream is preheated in heat exchanger 31 by being passed through internal conduit means, for example coils 32, in noncontact indirect heat exchange with a stream of heat transfer fluid which flows through heat exchanger 31 for example on the shell side. The preheated hydrocarbonaceous feedstream in line 33 is optionally mixed with a continuous stream of superheated steam from line 34 or a stream of other temperature moderating gas from line 35, valve 36, and line 37, for example steam from line 80, in a "T" fitting or mixer (not shown). The feed mixture is then passed through line 39, inlet 11, annulus passage 10, and discharge passage 12 of burner 6 into reaction zone 5 of partial oxidation gas generator 2.

Simultaneously, a continuous stream of preheated free-oxygen containing gas from line 40 is passed through center passage 7 and nozzle 9 of burner 6 into reaction zone 5 of gas generator 1 in admixture with said hydrocarbonaceous fuel and steam. The free-oxygen containing gas enters the system through line 41 and is compressed above the pressure in the gas generator by means of turbocompressor 42. Optionally, the compressed free-oxygen containing gas may be preheated by being passed through line 43, 44, valve 45, line 46 and into heat exchanger 31 where it passes through internal conduit means i.e. coil 47, line 48, and into line 40. The free-oxygen containing gas may be preheated by noncontact indirect heat exchange with heat transfer fluid which enters heat exchanger 31 through line 49 and which then passes through on the shell side. Alternately, the free-oxygen containing gas in line 43 may be passed through line 50, valve 51, line 52, heater 53 (optional), line 54, line 40, and into burner 6.

The continuous stream of hot effluent gas leaving partial oxidation gas generator by way of outlet 4 is partially cooled by being passed through heat exchanger 16 in noncontact indirect heat exchange with a counterflowing stream of gaseous heat transfer fluid. For example, the gaseous heat transfer fluid in line 56 is passed through flanged inlet 57 and passes up through top compartment 18 of heat exchanger 16 on the shell side. The hot gaseous heat transfer fluid leaves heat exchanger 16 by way of flanged outlet 59 and line 60. In the first embodiment, the continuous stream of partially cooled effluent gas flowing down heat exchanger 16 by-passes heat exchangers 58 and 23 and is then introduced into line 85, optional cooler 86, carbon removal zone 87, and optional gas purification zone 92. Then, at least a portion of the product gas is passed through line 97 into compressor 98, to be further described.

The second embodiment shown in the drawing depicts the production of by-product saturated steam, superheated steam, or both, as previously described. In such case the partially cooled effluent gas stream leaving heat exchanger 16 passes down through tubes or coils 19 in noncontact indirect heat exchange with a continuous stream of steam flowing up through the shell side 61 of a second heat exchange zone comprising heat exchanger 58. The steam picks up heat thereby and is converted into superheated steam which leaves heat exchanger 58 through outlet nozzle 62 and line 63. Optionally, but preferably, at least a portion of said superheated steam is introduced into gas generator 1 as the temperature moderator. For example, a stream of superheated steam may be passed through lines 63, 64, valve 65, line 34 and mixed in line 39 as previously discussed with hydrocarbonaceous fuel feed from line 33. The remainder of the stream of superheated steam from line 63 may be withdrawn by way of line 66, valve 67, line 68, and may be for example introduced into a power producing steam turbine 55 as the working fluid. The turbine exhaust leaves by line 81. Compressor 82 is driven by turbine 55 and compresses air from line 83. The compressed air from line 84 is separated in air separation unit 95 into a stream of oxygen in line 96 and nitrogen in line 99. The oxygen in line 96 may be introduced into gas generator 1 as said free-oxygen containing gas. In the embodiment using a third heat exchange zone comprising heat exchanger 23, the partially cooled effluent gas stream leaves the bottom compartment 20 of heat exchanger 58 through outlet 21 and enters heat exchanger 23 by way of inlet 22. In passing down through heat exchanger 23 by way of tubes or multi-coils 24, the effluent gas stream passes in noncontact indirect heat exchange with a counterflowing stream of boiler feed water passing on the shell side 69. The boiler feed water is thereby heated to produce steam by absorbing at least a portion of the remaining sensible heat in the effluent gas stream. For example, the boiler-feed water enters heat exchanger 23 through line 70 and flanged inlet 71. As the water passes up through heat exchanger 23 on the shell side 69 for example, it absorbs heat from the stream of effluent gas flowing down through heat exchanger 23 through multi-coils 24, and leaves through flanged outlet 72 and line 73 as steam. Optionally, the steam may be passed through valve 74, line 75, and flanged inlet 76 to bottom compartment 20 where it may be converted into superheated steam, as previously described. An alternate arrangement, not shown in the drawing, would have the gaseous heat transfer fluid flowing up through tubes in heat exchanger 16 in heat exchange with the raw synthesis gas flowing down through upper compartment 18 on the shell side 58. Similarly, in other embodiments the raw synthesis gas may flow down through heat exchangers 58 or 23, or both, on the shell side 61 or 69, or both, in noncontact heat exchange with steam or water in the remaining passages.

Compartments 18 and 20 may be contained in the same shell or in separate shells. Optionally, a portion of the steam may be removed from heat exchanger 23 by way of flanged outlet 77, line 78, valve 79 and line 80. This steam may be used elsewhere in the system for example as the working fluid in a steam turbine or to provide heat. Similarly, a portion of the superheated steam from outlet 62 of heat exchanger 58 may be optionally exported through lines 63, 107, valve 108, and line 109.

The cooled effluent gas stream leaves heat exchanger 23 by way of outlet 25, line 85 and optionally may be cooled further in heat exchanger 86, for example by preheating hydrocarbonaceous fuel before it is introduced into carbon removal zone 87 by way of line 88. Then by conventional methods as previously described, particulate carbon may be removed from the effluent gas stream which enters the carbon removal zone 87 by way of line 89. For example, particulate carbon may be removed by a solvent extraction process in which pumpable slurries of particulate carbon in heavy fuel oil are produced. In such case, the hydrocarbonaceous fuel enters the carbon removal zone through line 88 and the carbon slurry is removed by way of line 90. The carbon slurry may comprise at least a portion of the hydrocarbonaceous feed introduced into the system through line 30.

The clean effluent gas stream in line 91 may be optionally passed through line 130, valve 131, and line 132 into gas purification zone 92 and purified of any unwanted gas impurities i.e. $CO_2$, COS, $H_2S$, $CH_4$, $NH_3$, etc. by conventional procedures, as previously described. The clean and purified produce gas stream leaves through 93,133,94 valve 120 & 121. Optionally, at least a portion of the cleaned gas stream in line 91 may by-pass gas purification zone 92 by way of line 134, valve 135, and line 136.

A portion of the product gas stream in line 97 is compressed in compressor 98 and introduced into the loop of gaseous heat transfer fluid by way of line 56 as make-up to replace the gaseous heat transfer fluid that bleeds into the effluent gas stream in heat exchanger 16.

The gaseous heat transfer fluid circulating in the substantially closed loop may perform two functions. First, it serves as a heat transfer fluid by absorbing in heat exchanger 16 at the highest possible temperature, sensible heat from the effluent gas stream produced in the partial oxidation gas generator, and then releasing this heat in heat exchanger 31 for example to preheat hydrocarbonaceous feed stream 30, and optionally free-oxygen containing gas stream 43. Second, the heat transfer fluid may serve as the working fluid in turbine 100 which produces mechanical power by driving, for example, compressors 98 and 42, and electrical energy by driving, for example, electric generator 101. Compressors 98 and 42 are shown in the drawing to be on the same axial shaft 102–105 as turbine 100. Electric generator 101 is shown with shaft 105 connected to shaft 104 by means of flexible coupling 106. Other suitable mechanical linkages may be used for transferring the rotational power produced by expansion turbine 100.

After passing through the shell side of heat exchanger 31, the gaseous heat transfer fluid is passed through line 110, optionally through heat exchanger 111 which may be used for preheating boiler feed water, and lines 112 and 113 into compressor 98. The loop is closed by circulating compressed gaseous heat transfer fluid through line 56 into heat exchanger 16 for reheating. Optionally, a portion of the gaseous heat transfer fluid may be discharged from the loop by way of line 114, valve 115 and line 106.

An alternate scheme, not shown in the drawing, would be to preheat boiler feed water by heat exchange with said gaseous heat transfer fluid in heat exchanger 31 before said boiler feed water is introduced into heat exchanger 23.

EXAMPLE

The following example illustrates an embodiment of the process of this invention, and it should not be construed as limiting the scope of the invention. The process is continuous and the quantities specified are on an hourly basis for all streams of materials.

EXAMPLE I

The embodiment of the invention represented by Example I is depicted in the drawing as previously described. 3,352,958 standard cubic feet (SCF) of raw synthesis gas are continuously produced in a free-flow noncatalytic gas generator by partial oxidation of a hydrocarbonaceous fuel to be further described with oxygen (about 99.7 volume percent purity). The hydrocarbonaceous fuel is a pumpable slurry comprising 1,036 pounds of particulate carbon recovered later by cleaning the raw synthesis gas product and 57,300 pounds of reduced crude oil having the following ultimate analysis in Wt. %: C 85.87, $H_2$ 11.10, S 2.06, $N_2$ 0.78, $O_2$ 0.16 and ash 0.04. Further the reduced crude oil has an API gravity of 12.5, a heat of combustion of 18,333 BTU per pound, and a viscosity of 479 Saybolt Seconds Furol at 122° F. The hydrocarbonaceous fuel was previously preheated to a temperature of 500° F. by noncontact indirect heat exchange with gaseous heat transfer fluid, to be further described.

About 28,650 pounds of superheated steam produced subsequently in the process at a temperature of about 750° F. are mixed with said hydrocarbonaceous fuel to produce a feed mixture having a temperature of about 583° F. which is continuously introduced into the annulus passage of an annulus-type burner and which discharges into the reaction zone of said gas generator. About 744062 SCF of oxygen at a temperature of about 500° F. are continuously passed through the center passage of said burner and mixed with the dispersion of superheated steam, fuel oil, and particulate carbon. The oxygen stream was previously preheated by noncontact indirect heat exchange with heat transfer fluid, to be further described.

Partial oxidation and related reactions take place in the free-flow reaction zone of the gas generator to produce a continuous effluent stream of raw synthesis gas at a temperature of 2380° F. and a pressure of 415 psia. The effluent stream of hot raw synthesis gas from the gas generator passes down through the tubes of a separate first shell and tube heat exchanger comprising 2 zones. In the first zone the effluent stream of synthesis gas is cooled to a temperature of 870° F. by noncontact indirect heat exchange with a continuous stream of gaseous heat transfer fluid comprising clean and purified synthesis gas passing up on the shell side. About 5 vol. % of the gaseous heat transfer fluid entering the first heat exchanger bleeds through small diameter holes in the tubes and headers, forms a continuous moving protective sheath between the inside surfaces of said tubes and headers and the stream of hot effluent gas passing through said tubes and headers, and then mixes with said effluent gas stream. Then in the second zone in a separate second shell and tube heat exchanger the stream of raw synthesis gas passing down through the tubes is cooled to a temperature of about 816° F. by noncontact indirect heat exchange with about 28,650 pounds of saturated steam which passes up through the shell side of the second zone of said second heat exchanger at a temperature of 488° F. and a pressure of 610 psia. The saturated steam is converted into about 28,650 lbs. of superheated steam which leaves the first heat exchanger at a temperature of about 750° F. and a pressure of 600 psia. As previously described, at least a portion of this continuous stream of superheated steam is introduced into the gas generator, preferably in admixture with the hydrocarbonaceous fuel. Optionally, a portion of the superheated steam is used as the working fluid in a turbocompressor for example in an air separation plant for producing the free-oxygen feed to the gas generator.

The partially cooled stream of raw synthesis gas leaving the second heat exchanger is then passed through the tubes of a separate third heat exchanger and cooled to a temperature of about 520° F. by heat exchange with about 28,650 lbs. of boiler feed water supplied in a continuous stream. A stream of by-product saturated steam is thereby produced at a temperature of about 488° F. As previously described, at least a portion of this saturated steam is passed into the second heat exchanger for conversion into superheated steam.

The continuous effluent stream of raw synthesis gas leaving said third heat exchanger after heat exchange with said boiler feed water is at a pressure which is substantially the same as that in the reaction zone of the gas generator less ordinary pressure drop in the lines and heat exchangers. This pressure drop may be less than about 30 psi. The composition of the stream of raw synthesis gas leaving the gas generator is as follows in mole %: $H_2$ 41.55, CO 41.59, $CO_2$ 4.61, $H_2O$ 11.46, $H_2S$ 0.40, COS 0.02, $CH_4$ 0.13, $N_2$ 0.21, and $A_r$ 0.03. About 1045 lbs. of unconverted particulate carbon are entrained in the effluent stream of raw synthesis gas. Particulate carbon and other gaseous impurities may be removed from the raw synthesis gas in conventional downstream gas cleaning and purifying zones. A stream of synthesis gas product is produced having the following composition in mole %: $H_2$ 47.5, CO 47.5, $CO_2$ 4.5, and the remainder comprising a mixture of $CH_4$, $A_r$, $N_2$ and COS. A portion of said product gas is used in a substantially closed loop as make-up gaseous heat transfer fluid.

Thus 155,544 lbs. of said gaseous heat transfer fluid enters said first heat exchanger at a temperature of 795° F. and a pressure of 430 psia.

About 5 vol. % of the gaseous heat transfer fluid bleeds through the openings in the tubes. The remainder of the stream of heat transfer fluid leaves said first heat exchanger at a temperature of 2270° F. and at substantially the same pressure, and is then passed through a power developing expansion turbine. The pressure of the heat transfer fluid leaving the expansion turbine is about 47 psia, and the temperature falls about 1000° F. After passing in noncontact indirect heat exchange with the oxygen feedstream, the stream of hydrocarbonaceous feed, and boiler feed water the temperature of the gaseous heat transfer fluid is reduced to about 120° F. Then by means of a compressor driven by said expansion turbine, the pressure of the heat transfer fluid is raised to 430 psia. Make-up gaseous heat transfer fluid is introduced into said compressor as previously mentioned to account for bleeding through the tube and header walls in heat exchanger 16, seal leakage, etc. The aforesaid expansion turbine also provides the driving force for an oxygen feed compressor and for an electric generator. The compressed heat transfer fluid is then recycled to said first zone of said first heat exchanger.

Advantageously, by the subject process, the severity of the operating conditions on heat exchanger tubes and headers may be minimized and controlled. Since fouling of the heat transfer surfaces is prevented, the surface area required for a given amount of heat will be decreased from about 25 to 35%. Further, the size of the heat exchangers may be decreased about 50 to 75%. Bleed will not necessarily be required for the full length of the tubes, since the gas temperatures are reduced near the downstream end due to heat transfer; and $H_2S$ attack strength is correspondingly reduced. Accordingly, the tubes and headers may be made from heat and corrosion resistant materials at the upstream (hot) end and less expensive materials at the downstream (cooler) end. Dissimilar materials may be joined by close fitting slip joints. This would eliminate thermal stresses due to the growth of the tubes and permit firm tie-down of the headers. The leakage that would occur can be controlled by the fit and would be incorporated as part of the bleed system described previously.

The process of the invention has been described generally and by examples with reference to materials of particular compositions for purposes of clarity and illustration only. It will be apparent to those skilled in the art from the foregoing that various modifications of the process and materials disclosed herein can be made without departure from the spirit of the invention.

We claim:

1. In the process for producing gaseous mixtures comprising $H_2$, CO and containing at least one member of the group $H_2O$, $CO_2$, $H_2S$, COS, $CH_4$, $N_2$, $A_r$, and particulate carbon, by the partial oxidation of a hydrocarbonaceous fuel, or liquid oxygenated hydrocarbonaceous fuel, or a slurry of solid carbonaceous fuel and water or a liquid hydrocarbon, with a free-oxygen containing gas and optionally in the presence of a temperature moderator, at a temperature in the range of about 1500° to 3500° F. and a pressure in the range of about 1 to 250 atmospheres absolute in the reaction zone of a free-flow noncatalytic gas generator, the improvement comprising: (1) continuously passing the raw effluent gas stream leaving the reaction zone of said gas generator through a first heat exchange zone comprising a shell and tube heat exchanger in heat exchange with a continuous stream of a gaseous heat transfer fluid from step (6), thereby cooling said hot effluent gas stream while simultaneously heating said gaseous heat transfer fluid; (2) continuously bleeding a portion of said gaseous heat transfer fluid into said hot stream of effluent gas in (1) by way of openings in the walls of said tubes, while placing a sheath or curtain of gaseous heat transfer fluid between the surface of said tubes and said stream of effluent gas; (3) cleaning and optionally purifying the mixture of effluent gas and said bleedstream portion of gaseous heat transfer fluid in a gas cleaning and purifying zone, producing a product gas stream; (4) introducing the stream of heated gaseous heat transfer fluid leaving said first heat exchange zone in (1) into a power developing means as the working fluid and thereby producing power; (5) cooling the exhaust stream of gaseous heat transfer fluid leaving the power developing means in (4) and compressing at least a portion of said cooled stream and at least a portion of the product gas stream from (3) to a pressure above that of the raw effluent gas stream in (1); and (6) recycling the compressed mixture of gases from (5) into the first heat exchange zone in (1) as said gaseous heat transfer fluid.

2. The process of claim 1 provided with the steps of cleaning by removing entrained solids, and purifying the gas mixture in step (3) to remove unwanted gaseous constituents, thereby producing a stream of product gas; and compressing about 1 to 50 volume % of said product gas stream in step (5) as make-up gaseous heat transfer fluid.

3. The process of claim 1 wherein the compressed gaseous heat transfer fluid from step (6) is recycled to the first heat exchange zone in step (1) at a temperature in the range of about 100° to 1300° F. and a pressure in the range of about 150 to 3800 psia, and leaves said first heat exchange zone at a temperature in the range of about 800° to 2800° F. and at substantially the same pressure; and the power developing means in step (2) is a turbine, and the exhaust stream of gaseous heat transfer fluid leaves said turbine at a temperature in the range of about 500° to 1800° F. and at a pressure in the range of about 15 to 150 psia and is then cooled in step (5) to a temperature in the range of about 60° to 1200° F.

4. The process of claim 1 provided with the additional step of cooling the effluent gas stream leaving the first heat exchange zone by indirect heat exchange with steam in a second heat exchange zone thereby producing superheated steam.

5. The process of claim 4 provided with the additional step of cooling the effluent gas stream leaving the second heat exchange zone by indirect heat exchange with water in a third heat exchange zone thereby producing steam; and introducing said steam into said second heat exchange zone to produce superheated steam.

6. The process of claim 1 wherein step (5) the exhaust stream of gaseous heat transfer fluid is cooled by being first passed in series in noncontact heat exchange with said feed stream of free-oxygen containing gas whose temperature is thereby increased to a value in the range of about 200° F. to 1800° F., and then introducing said hot stream of free-oxygen gas into said partial oxidation gas generator; and second by passing the partially cooled stream of gaseous heat transfer fluid in noncontact heat exchange with a feed stream of hydrocarbonaceous fuel whose temperature is thereby increased to a value in the range of about 200° to 1200° F., and then introducing said hot stream of hydrocarbonaceous fuel into said partial oxidation gas generator.

7. The process of claim 1 where a portion of the power developed in step (4) from said power developing means is used to drive an electric generator.

8. The process of claim 1 wherein the free-oxygen containing gas is selected from the group consisting of air, oxygen-enriched air (more than 21 mole % $O_2$) and substantially pure oxygen (more than 95 mole % $O_2$).

9. The process of claim 1 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

10. The process of claim 1 wherein said hydrocarbonaceous fuel is a gaseous hydrocarbon.

11. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

12. A process of claim 1 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

13. The process of claim 1 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a vaporizable carrier such as water, liquid hydrocarbon and mixtures thereof.

14. In the process for producing gaseous mixtures comprising $H_2$, CO and containing at least one member of the group $H_2O$, $CO_2$, $H_2S$, COS, $CH_4$, $N_2$, $A_r$ and particulate carbon, by the partial oxidation of a hydrocarbonaceous fuel, or liquid oxygenated hydrocarbonaceous fuel, or a slurry of solid carbonaceous fuel and water or a liquid hydrocarbon with a free-oxygen containing gas and optionally in the presence of a temperature moderator, at a temperature in the range of about 1500° to 3500° F. and a pressure in the range of about 1 to 250 atmospheres absolute in the reaction zone of a free-flow noncatalytic gas generator, the improvement comprising: (1) continuously passing the raw effluent gas stream leaving the reaction zone of said gas generator, optionally through a solids separation zone following said gas generator with substantially no reduction in pressure, into a first heat exchange zone comprising a shell and tube heat exchanger optionally with headers in heat exchange with a continuous stream of gaseous heat transfer fluid which enters said zone at a temperature in the range of about 100° to 1300° F. and a pressure in the range of about 150 to 3800 psia and leaves at a temperature in the range of about 800° to 2800° F. and substantially the same pressure; continuously bleeding about 1 to 50 volume % of said gaseous heat transfer fluid into said effluent gas stream by way of openings in the walls of said tubes and optionally in said headers while placing a sheath or curtain of gaseous heat transfer fluid between the surfaces of said tubes and optionally said headers and said stream of effluent gas; passing the partially cooled raw effluent gas stream in admixture with said bleedstream portion of gaseous heat transfer fluid from said first heat exchange zone directly into a second heat exchange zone in noncontact heat exchange with a continuous stream of steam produced subsequently in the process at a temperature in the range of about 298° to 705° F. and a pressure in the range of about 65 to 3800 psia thereby converting said steam into a continuous stream of superheated steam at a temperature in the range of about 750 to 1100° F. and a pressure in the range of about 65 to 3800 psia while simultaneously reducing the temperature of the continuous stream of raw effluent gas in admixture with said bleedstream leaving said second heat exchange zone; (2) removing a continuous stream of said superheated steam from (1) as a by-product stream; (3) continuously passing the stream of effluent gas mixture leaving said second heat exchange zone directly into noncontact heat exchange with a stream of water in a third heat exchange zone thereby converting said water into a continuous stream of steam at a temperature in the range of about 298° to 705° F. and a pressure in the range of about 65 to 3800 psia while simultaneously reducing the temperature of the continuous stream of effluent gas mixture leaving said third heat exchange zone to a value in the range of about 300° to 700° F.; (4) introducing at least a portion of the stream of steam from (3) into the second heat exchange zone in step (1) as said steam; (5) cleaning and optionally purifying the stream of effluent gas mixture leaving (3) in gas cleaning and purification zones to produce a product gas stream; (6) introducing the stream of hot gaseous heat transfer fluid leaving (1) into a power developing turbine as the working fluid and removing therefrom gaseous heat transfer fluid having a temperature in the range of about 500° to 1800° F. and a pressure in the range of about 15 to 150 psia; (7) cooling the gaseous heat transfer fluid leaving (6) by noncontact heat exchange with at least one feedstream which is then introduced into said gas generator; and (8) compressing the gaseous heat transfer fluid from (7) and a portion of the product gas stream from (5) as make-up for the bleedstream of gaseous heat transfer fluid in (1) to a pressure greater than that of the raw effluent gas stream in said first heat exchange zone by means of a compressor powered by said turbine and recycling the resulting gaseous heat transfer fluid into said first heat exchange zone in (1).

15. The process of claim 14 wherein said first and second heat exchange zones are contained within the same shell.

16. The process of claim 14 wherein said second and third heat exchange zones are contained within the same shell.

17. The process of claim 14 wherein said first and second heat exchange zones are contained within the same first shell and said third heat exchange zone is contained in a second shell that is separated from and connected in series with said first shell.

18. The process of claim 14 wherein said first, second and third heat exchange zones are contained in separate shells that are connected in series.

19. The process of claim 14 wherein said product gas comprises in mole %: $H_2$ 10 to 48, CO 15 to 48 and the remainder comprising a mixture of $N_2$ and $A_r$.

20. The process of claim 14 wherein at least a portion of the by-product superheated steam from step (2) is introduced into the reaction zone of said gas generator.

21. The process of claim 20 wherein said hydrocarbonaceous feed to the gas generator is entrained in said superheated steam.

22. The process of claim 14 wherein at least a portion of the by-product superheated steam from step (2) is used as the working fluid in a steam turbine used to compress air feed to an air separation unit thereby producing oxygen (95 mole % or more) for reacting in said gas generator.

23. The process of claim 14 provided with the additional step of removing at least a portion of unwanted solid matter from the group particulate carbon, ash, slag, scale, refractory, and mixtures thereof entrained in the effluent gas stream leaving the gas generator or flowing from the gas generator prior to introducing said gas stream into said first heat exchange zone.

24. The process of claim 23 wherein the effluent gas stream leaving said third heat exchange zone is at substantially the same pressure as in the reaction zone of said gas generator less ordinary pressure drop across the solids or slag separation zone, said first, second, and third heat exchange zones, and in the lines.

25. The process of claim 14 wherein step (7) hydrocarbonaceous fuel is preheated to a temperature of about 200° to 1200° F. but below its cracking temperature prior to introducing said fuel into the gas generator.

26. The process of claim 14 wherein at least a portion of the superheated steam from step (2) is introduced as the working fluid into a steam turbine for producing mechanical work or electrical energy.

27. The process of claim 14 wherein the free-oxygen containing gas is selected from the group consisting of air, oxygen-enriched air (more than 21 mole % $O_2$) and substantially pure oxygen (more than 95 mole % $O_2$).

28. The process of claim 14 wherein said hydrocarbonaceous fuel is a liquid hydrocarbon selected from the group consisting of liquefied petroleum gas, petroleum distillates and residues, gasoline, naphtha, kerosine, crude petroleum, asphalt, gas oil, residual oil, tar-sand oil, shale oil, coal derived oil, aromatic hydrocarbons such as benzene, toluene, xylene fraction, coal tar, cycle gas oil from fluid-catalytic-cracking operation, furfural extract of coker gas oil, and mixtures thereof.

29. The process of claim 14 wherein said hydrocarbonaceous fuel is a gaseous hydrocarbon.

30. The process of claim 14 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containting oxygenated hydrocarbonaceous organic materials and mixtures thereof.

31. The process of claim 14 wherein said hydrocarbonaceous fuel is a pumpable slurry of solid carbonaceous fuel selected from the group consisting of coal, lignite, particulate carbon, petroleum coke, and concentrated sewer sludge and mixtures thereof, in a carrier such as water, liquid hydrocarbon and mixtures thereof.

32. The process of claim 14 wherein step (1) said gaseous heat transfer fluid is passed up through the tubes and optionally also through the headers of said first heat exchanger while simultaneously said raw effluent gas stream in admixture with the bleedstream of gaseous heat transfer fluid is passed down through the shell side of said first heat exchanger.

33. The process of claim 14 wherein step (1) said gaseous heat transfer fluid is passed up through the shell side of said first heat exchanger while simultaneously said raw effluent gas stream in admixture with the bleedstream of gaseous heat transfer fluid is passed down through the headers and tubes of said first heat exchanger.

34. The process of claim 14 provided with the additional steps of producing a stream of substantially pure hydrogen from at least a portion of the product gas stream from step (5), and using said hydrogen in the system as said heat transfer fluid.

35. The process of claim 14 provided with the steps of burning a portion of the product gas stream from step (5) in the combustor of a gas turbine as fuel, and passing the gaseous products of combustion through an expansion turbine for the production of mechanical power.

36. In the process for producing gaseous mixtures comprising $H_2$, CO and containing at least one member of the group $H_2O$, $CO_2$, $H_2S$, COS, $CH_4$, $N_2$, $A_r$ and particulate carbon, by the partial oxidation of a hydrocarbonaceous fuel, or liquid oxygenated hydrocarbonaceous fuel, or a slurry of solid carbonaceous fuel and water or a liquid hydrocarbon, with a free-oxygen containing gas and optionally in the presence of a temperature moderator, at a temperature in the range of about 1500° to 3500° F. and a pressure in the range of about 1 to 250 atmospheres absolute in the reaction zone of a free-flow noncatalytic gas generator, the improvement comprising (1) continuously passing the raw effluent gas stream leaving the reaction zone of said gas generator optionally through a solids separation zone following said gas generator, into the tubes and optionally the upstream header of a first shell and tube-type heat exchanger in heat exchange with a continuous stream of gaseous heat transfer fluid substantially comprising a mixture of hydrogen and carbon monoxide as produced in step (7), said gaseous heat transfer fluid entering said first heat exchanger on the shell side at a temperature in the range of about 100° to 1300° F. and a pressure in the range of about 150 to 3800 psia and leaves at a temperature in the range of about 800° to 2800° F. and at substantially the same pressure; continuously bleeding about 1 to 50 volume % of said gaseous heat transfer fluid into said effluent gas stream by way of openings in the walls of said tubes and optionally in said headers while placing a sheath or curtain of gaseous heat transfer fluid between the surfaces of said tubes and optionally said headers and said stream of effluent gas; (2) introducing the stream of hot gaseous heat transfer fluid leaving (1) into a power developing expansion turbine as the working fluid and removing therefrom expanded gaseous heat transfer fluid having a temperature in the range of about 500° to 1800° F. and a pressure in the range of about 15 to 150 psia; (3) passing the gaseous heat transfer fluid leaving (2) in noncontact indirect heat exchange with at least one other stream in a separate heat exchange zone; (4) compressing the heat transfer fluid from (3) and the make-up heat transfer fluid from (8) to a pressure greater than the raw effluent gas stream in the first shell and tube-type heat exchanger in (1) by means of a compressor driven by said expansion turbine; (5) recycling the compressed heat transfer fluid from (4) into the shell side of said first heat exchanger in step (1); (6) cooling the partially cooled raw effluent gas stream in admixture with said bleedstream portion of gaseous heat transfer fluid leaving the first heat exchanger in step (1) by passing said effluent gas stream mixture through the tubes of a second shell and tube-type heat exchanger in noncontact indirect heat exchange with steam which enters said second heat exchanger on the shell side, thereby producing by-product superheated stream; and cooling further the partially cooled raw effluent gas stream leaving the second heat exchanger in (6) by passing said effluent gas stream through the tubes of a third shell and tube-type heat exchanger in noncontact indirect heat exchange with water which enters said third heat exchanger on the shell side, thereby producing steam, and introducing said steam into the shell side of said second heat exchanger; (7) cleaning the cooled effluent gas stream from said third heat exchanger in (6) by removing entrained solids, and purifying said gas stream to remove unwanted gaseous constituents thereby producing a product gas stream substantially comprising a mixture pf hydrogen and carbon monoxide; and (8) introducing a portion of said product gas stream from (7) into the compressor in step (4) as make-up gaseous heat transfer fluid.

37. The process of claim 36 provided with the additional steps of introducing at least a portion of the product gas stream from step (7) into the combustor of a gas turbine, and introducing the products of combustion into an expansion turbine for producing power.

* * * * *